B. G. SOMERVILLE.

CREAM REMOVER.

APPLICATION FILED DEC. 18, 1919.

Reissued Dec. 28, 1920. 15,017.

Inventor
Benjamin G. Somerville.

By Charles L. Wright.
his Attorney

UNITED STATES PATENT OFFICE.

BENJAMIN G. SOMERVILLE, OF NEW YORK, N. Y.

CREAM-REMOVER.

15,017. Specification of Reissued Letters Patent. Reissued Dec. 28, 1920.

Original No. 1,288,725, dated December 24, 1918, Serial No. 233,912, filed May 11, 1918. Application for reissue filed December 18, 1919. Serial No. 345,915.

*To all whom it may concern:*

Be it known that I, BENJAMIN G. SOMERVILLE, a citizen of the United States, and a resident of New York, county of Bronx, and State of New York, have invented certain new and useful Improvements in Cream-Removers, of which the following is a specification.

This invention has as its main object to provide an apparatus capable of separating liquids of different specific gravity and removing one from another, such for instance as oil from water, grease from gravies, cream from milk, etc., or vice-versa, without agitation or mixing the liquids, the process being accomplished by hand in an easy, cleanly and practical manner.

A further object is to provide such an apparatus capable of containing a considerable quantity of the separated material and of discharging the same as desired.

Another object is to so construct the apparatus that its conical body may act as a stopper for the bottle or original container, the contents of the body being clearly visible and all parts of the device, making contact with the liquids, readily amenable to antiseptic treatment whereby they may be rendered clean and sanitary.

These and other like objects are attained by the novel construction and combination of parts, hereinafter described and shown in the accompanying drawings, forming a material part of this disclosure, and in which:—

Figure 1:
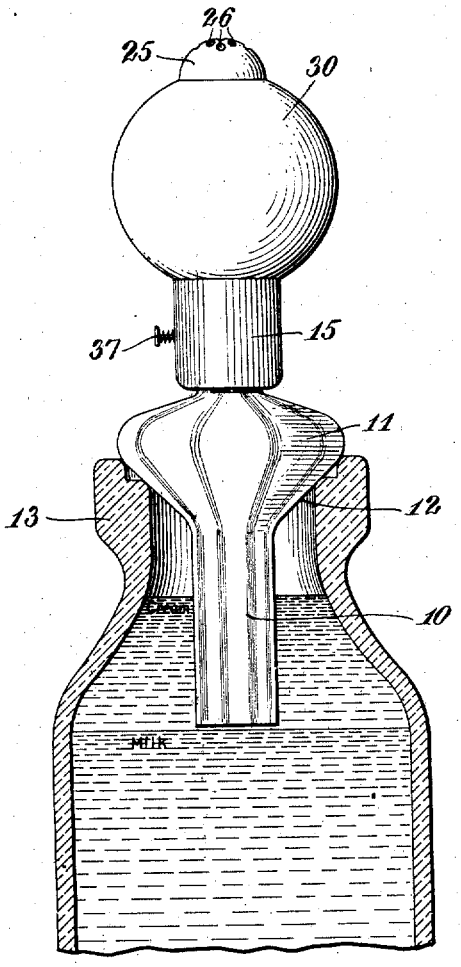
Figure 1 is a side elevational view of a hand suction pump, made in accordance with the invention, and showing its application.
Figure 2:
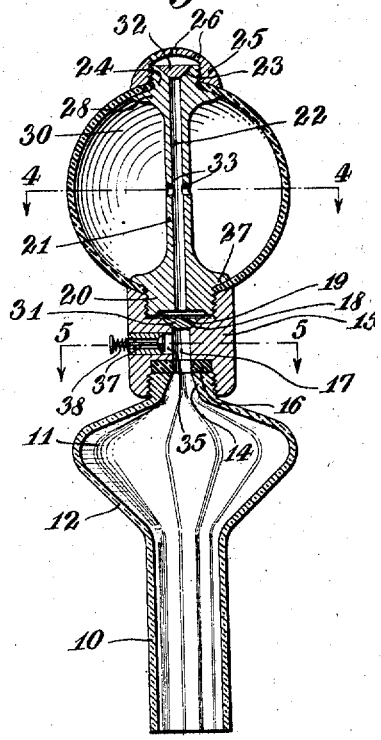
Fig. 2 is a vertical sectional view of the same.
Figure 3:
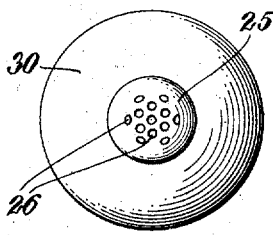
Fig. 3 is a top plan view thereof.
Figure 4:
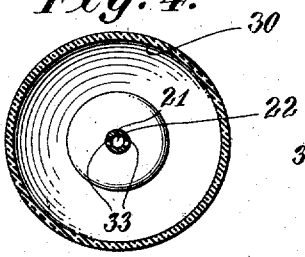
Fig. 4 is a transverse sectional view, taken on line 4—4 of Fig. 2.
Figure 5:
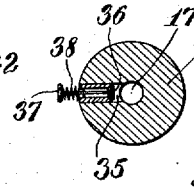
Fig. 5 is a transverse sectional view, taken on line 5—5 of Fig. 2.

Referring to the drawings in detail, the numeral 10 designates a tube depending from a hollow annular bulbous body 11 having a conical lower portion 12 adapted to act as a temporary stopper or cover for a container, as indicated by the milk bottle 13, into which the tube extends.

An integral screw-threaded nipple 14 is formed with the body opposite the tube, these elements being preferably made of clear transparent glass by the usual molding process.

Connected to the nipple is a double socket or collet 15, the end of the nipple making contact with a packing ring or washer 16 set in the lower recess of the socket, the opening of the washer alining with an axial passage 17 leading to a valve seat 18 at the bottom of the upper recess 19, in the socket.

Engaged in the socket 15 is the screw-threaded base 20 of a post 21 having an axial passage 22 extending to a valve seat 23 in the post head 24, which is screw-threaded exteriorly and provided with a cap 25 containing a plurality of small perforations 26.

Formed with the base of the post is an annular flange 27, a similar flange 28 extending out from the head 24.

A hollow collapsible rubber bulb 30, having openings at opposite points, is clamped firmly to the upper concave end of the socket 15 by the flange 27 and also on the flange 28 by the edges of the cap 25, the post passing centrally through the bulb, supporting and securing the same to the socket.

A valve 31, is fitted to the seat 18 controlling the passage 17 leading to the body 11 and another valve 32 is fitted to the seat 23 controlling the passage 22 through the post, which is provided with transverse ports 33 permitting air to enter the hollow post when the bulb is compressed.

Formed transversely through the wall of the socket 15, below the valve seat 18, is a port opening 35 controlled by a valve 36 having an extending operating stem 37 held normally extended by a coiled spring 38, the port 35 communicating with the passage 17 so as to admit air therein when the stem is depressed.

In operation, the stem or tube having been entered into the liquid it is desired to separate, as for instance cream from the milk in the bottle 13, the bulb 30 is compressed, which action causes the air therein to pass through the ports into the hollow post, and as the valve 31 is closed by gravity, the upper valve 32 is raised from its seat permitting the escape of the air through the perforate cap.

Upon releasing the pressure on the elastic bulb, air is drawn up past the valve 31 from the body 11, and out through the post ports, the valve 32 automatically closing.

The rarefaction of air, or partial vacuum thus obtained in the body creates a suction on the cream, partially or wholly filling the body, according to the respective proportions or internal volumes of the body and bulb.

The apparatus may then be removed from the container in a partially or wholly filled condition as desired and the contents of the body discharged by gravity whenever required by operating the valve 36, admitting air to the body below the valve 31, in a manner which will be readily understood.

In practice it is preferred to make the volume at least equal to the volume of the the body so that the latter may be filled at a single operation, although it will be evident that the body and stem may be completely filled by successive operations of the bulb.

It will be manifest that the apparatus may be used for many other purposes than those specified, and as the liquid operated upon only enters the glass body, the remaining portions of the instrument do not become wet or soiled while the quantity of liquid can always be visually ascertained.

It is to be understood that the foregoing disclosure is to be regarded as descriptive rather than limitative of the invention, of which obviously modified forms may be made without departing from the spirit of the appended claims.

What I claim as new and desire to secure by Letters Patent, is:—

1. A device of the class described comprising in combination a hollow transparent body having an attenuated stem, a tubular socket engaged with said body, an elastic compressible globular element fixed on said socket communicating with said body, a tubular post extending longitudinally within said elastic element, having openings communicating with the interior of said globular element, an exhaust valve for said globular element, said exhaust valve controlling the air outlet passage in said post, a valve controlling the passage in said socket, and a manually operable valve in said socket below said control valve.

2. A hand suction pump comprised of a hollow transparent bulbous body having an integral tubular stem depending therefrom, a screw-threaded nipple extending oppositely from said stem, a socket engaged on said nipple, said socket having an axial passage, a compressible bulb fixed on said socket, a tubular post extending from said socket axially through said bulb, said post having transverse openings permitting the passage of air, an outlet valve at the end of said post, a perforate cover therefor, a suction valve in the passage of said socket, and a manually operable inlet valve in said socket permitting the entrance of air to said body.

3. In a device of the class described, the combination with a tubular body having a hollow stem, and manually operable means for admitting air to said body, of a tubular post having its lower end detachably connected with said body, a perforated cap engaged with the upper end of said post, a bulb having its upper end clamped under said cap and its lower end connected with said body, said post having a transverse port whereby its bore is in communication with the interior of said bulb, and valves for said post located respectively within said body and within said cap.

4. In a device of the class described, the combination with a tubular body, a socket connected with the upper end of said body, said socket having a recess in its upper end, and manually operable means for opening the interior of said socket to the outside air, of a tubular post having an enlargement at its lower end threaded into the mentioned recess and a screw-threaded enlargement at its upper end, a perforate cap fitted to said upper enlargement, a bulb having its upper end clamped under said cap and its lower end clamped against said socket, said post having a transverse port intersecting its bore and communicating with the interior of said bulb, an inlet valve within said socket, and an outlet valve within said cap.

BENJAMIN G. SOMERVILLE.